(12) United States Patent
Kueppers et al.

(10) Patent No.: US 9,796,573 B2
(45) Date of Patent: Oct. 24, 2017

(54) LIFTING-DEVICE BRAKE SYSTEM

(71) Applicant: MHWIRTH GMBH, Erkelenz (DE)

(72) Inventors: Jochen Kueppers, Wassenberg (DE); Roland Moll, Heinsberg (DE); Marcell Welters, Moenchengladbach (DE)

(73) Assignee: MHWIRTH GMBH, Erkelenz (DE)

( * ) Notice: Subject to any disclaimer, the term of this patent is extended or adjusted under 35 U.S.C. 154(b) by 0 days.

(21) Appl. No.: 14/910,259

(22) PCT Filed: Jul. 2, 2014

(86) PCT No.: PCT/EP2014/064069
§ 371 (c)(1),
(2) Date: Feb. 5, 2016

(87) PCT Pub. No.: WO2015/018569
PCT Pub. Date: Feb. 12, 2015

(65) Prior Publication Data
US 2016/0167937 A1    Jun. 16, 2016

(30) Foreign Application Priority Data
Aug. 7, 2013 (DE) .......... 10 2013 108 495

(51) Int. Cl.
*B66D 5/26* (2006.01)
*B66F 17/00* (2006.01)
(Continued)

(52) U.S. Cl.
CPC ............. *B66F 17/00* (2013.01); *B66D 5/14* (2013.01); *B66D 5/26* (2013.01); *F16D 65/28* (2013.01); *F16D 59/02* (2013.01); *F16D 2121/06* (2013.01)

(58) Field of Classification Search
CPC .. B66D 5/00; B66D 5/26; B66F 17/00; F16D 2121/06; F16D 59/02
(Continued)

(56) References Cited

U.S. PATENT DOCUMENTS

| 4,638,894 A | 1/1987 | Sitabkhan et al. |
| 6,715,590 B2 * | 4/2004 | Tabor .............. B60T 7/042 |
| | | 188/170 |

(Continued)

FOREIGN PATENT DOCUMENTS

| CN | 101468643 A | 7/2009 |
| CN | 102791549 A | 11/2012 |

(Continued)

*Primary Examiner* — Thomas Irvin
(74) *Attorney, Agent, or Firm* — Norman B. Thot

(57) ABSTRACT

A lifting-device brake system includes at least one brake assembly configured to be activated by a spring force. The at least one brake assembly is configured to achieve a braking effect. At least one piston/cylinder assembly is configured to be actuated by a hydraulic or pneumatic pressure via which the braking effect achieved by the at least one brake assembly can be reduced by at least partially overcoming the spring force. A hydraulic or pneumatic assembly is configured to provide the hydraulic or pneumatic pressure to actuate the at least one piston/cylinder assembly. The hydraulic or pneumatic assembly comprises an apparatus configured to maintain the hydraulic or pneumatic pressure applied to the at least one piston/cylinder assembly.

4 Claims, 3 Drawing Sheets

(51) Int. Cl.
   *B66D 5/14*      (2006.01)
   *F16D 65/28*     (2006.01)
   *F16D 59/02*     (2006.01)
   *F16D 121/06*    (2012.01)

(58) Field of Classification Search
   USPC .......... 188/170; 303/9.76, 71; 187/223, 351
   See application file for complete search history.

(56) References Cited

U.S. PATENT DOCUMENTS

| | | | | |
|---|---|---|---|---|
| 7,273,136 | B2 * | 9/2007 | Goto | B60T 13/04 |
| | | | | 188/170 |
| 8,028,788 | B2 * | 10/2011 | Stilwell | B60T 1/062 |
| | | | | 180/370 |
| 8,615,992 | B2 * | 12/2013 | Naito | B60T 13/22 |
| | | | | 188/170 |
| 2008/0314701 | A1 | 12/2008 | Bogelein et al. | |
| 2010/0089704 | A1 * | 4/2010 | Petronek | B66F 9/183 |
| | | | | 187/224 |
| 2013/0004279 | A1 * | 1/2013 | Naito | B60T 13/22 |
| | | | | 414/685 |
| 2016/0332844 | A1 * | 11/2016 | Polin | B66B 5/027 |

FOREIGN PATENT DOCUMENTS

| | | |
|---|---|---|
| DE | 41 06 595 C2 | 4/2001 |
| DE | 10 2007 028 688 A1 | 12/2008 |
| DE | 10 2009 030 997 B3 | 9/2010 |
| EP | 0 203 758 A2 | 12/1986 |
| EP | 2 006 563 A1 | 12/2008 |
| GB | 2 241 488 A | 9/1991 |
| JP | 2007-99493 A | 4/2007 |

* cited by examiner

Fig. 1

LIFTING-DEVICE BRAKE SYSTEM

CROSS REFERENCE TO PRIOR APPLICATIONS

This application is a U.S. National Phase application under 35 U.S.C. §371 of International Application No. PCT/EP2014/064069, filed on Jul. 2, 2014 and which claims benefit to German Patent Application No. 10 2013 108 495.8, filed on Aug. 7, 2013. The International Application was published in German on Feb. 12, 2015 as WO 2015/018569 A1 under PCT Article 21(2).

FIELD

The present invention relates to a lifting-device brake system comprising at least one brake assembly that can be activated by a spring force, at least one piston/cylinder assembly which can be hydraulically or pneumatically actuated and via which the braking effect that can be achieved by the at least one brake assembly can be reduced by at least partially overcoming the spring force, and a hydraulic or pneumatic assembly which provides the hydraulic or pneumatic pressure required to actuate the at least one piston/cylinder assembly.

BACKGROUND

In addition to a lifting-device brake system having exactly one brake assembly that can be activated by a spring force, the present invention thus also relates to a lifting-device brake system having more than one brake assembly that can be activated by a spring force, for example, exactly two, exactly three, or more brake assemblies that can be activated by a spring force.

Each brake assembly that can be activated by a spring force can in turn comprise exactly one or a plurality of brakes, for example, exactly two, exactly three, exactly four, or more brakes. The brakes can, for example, be disk brakes.

Lifting devices of the type here discussed are used to lower and raise heavy loads, particularly of firmly anchored or floating platforms, to or from the seabed.

Such lifting devices always comprise brake systems so that the lowering speed can be controlled and, if necessary, stopping can be performed as quickly as possible ("emergency stop").

Such brake systems are designed to be activated by a spring force in order to provide the greatest possible operating reliability. This means that the pressure via which stationary actuating elements are pressed against rotating parts of the brake assembly, in the case of disk brake assemblies, the brake linings against the brake disk, is provided mechanically via a spring force. In order to reduce the braking force, piston/cylinder assemblies that can be hydraulically or pneumatically actuated are then provided which act against the spring force when pressure is applied and via which the pressure, under which the stationary parts lie against the rotating part of the brake assembly, thus can be varied. Such a brake assembly design has the advantage that, when irregularities that lead to pressure losses occur in the hydraulic or pneumatic assembly, the brake assembly is not released, but is rather blocked. When the "emergency stop" is triggered, it is merely necessary to relieve the pressure present at the piston/cylinder assemblies, which can be accomplished, for example, by opening a return valve or a discharge valve.

Such a lifting-device brake system can, however, prove to be problematic if the lifting device is used on floating platforms in conjunction with systems for wave compensation ("active heave systems"). In this case, the motion of the platform relative to the seabed caused by the wave motion is sensed and the lifting device is controlled so that the load is at least approximately stationary in relation to the seabed. If, in this case, the brake assembly were also activated when an "emergency stop" that shuts down the entire installation is activated, the load carried by the lifting device would be set into the motion of the platform caused by the wave motion, and, because of inertia, this would lead to high forces acting on the load, the lifting device, and the platform. This circumstance is especially problematic if the lifting device is used to raise and lower a drill string that is firmly connected to the bottom ("locked to bottom"). In this case, activation of the brake assembly would result in either the string being torn off, in the case of an upward motion of the platform, or the platform not being able to follow the wave motion, whereby in the worst case the platform would be pulled under water.

SUMMARY

An aspect of the present invention is to provide a lifting-device brake system which reliably prevents, in the case of wave compensation control, the brake assemblies of the lifting device from being activated in an "emergency stop" event or if the energy supply fails.

In an embodiment, the present invention provides a lifting-device brake system which includes at least one brake assembly configured to be activated by a spring force. The at least one brake assembly is configured to achieve a braking effect. At least one piston/cylinder assembly is configured to be actuated by a hydraulic or pneumatic pressure via which the braking effect achieved by the at least one brake assembly can be reduced by at least partially overcoming the spring force. A hydraulic or pneumatic assembly is configured to provide the hydraulic or pneumatic pressure to actuate the at least one piston/cylinder assembly. The hydraulic or pneumatic assembly comprises an apparatus configured to maintain the hydraulic or pneumatic pressure applied to the at least one piston/cylinder assembly.

BRIEF DESCRIPTION OF THE DRAWINGS

The present invention is described in greater detail below on the basis of embodiments and of the drawings in which:

FIG. 1 shows the hydraulic schematic diagram in the "brake activated" operating state;

DETAILED DESCRIPTION

Figure 2:
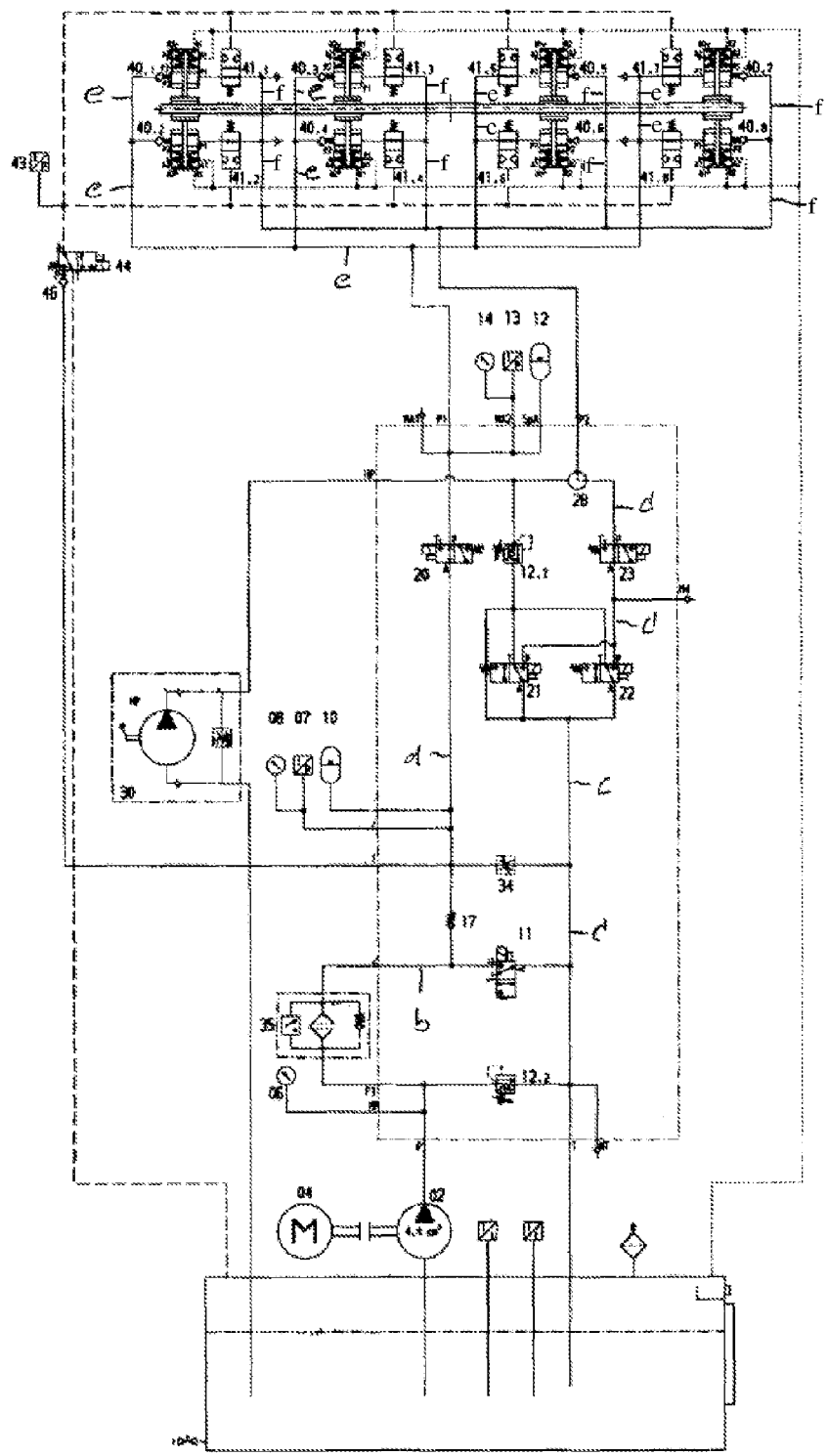
FIG. 2 shows the hydraulic schematic diagram in the "brake open" operating state.

According to the present invention, the hydraulic or pneumatic assembly of this lifting-device brake system comprises an apparatus via which the hydraulic or pneumatic pressure applied to the at least one piston/cylinder assembly can be optionally lastingly maintained.

"Lastingly" here means a time period which, according to experience, is sufficient even under unfavorable conditions to put the installation back into operation after an "emergency stop," to completely haul up the load, or to disconnect the lifting device from the load.

The apparatus via which the hydraulic or pneumatic pressure can be lastingly maintained can, for example, comprise a switching valve arranged in a return line for the hydraulic or pneumatic actuating medium, directly after the piston/cylinder assembly, via which switching valve the return line can be optionally closed so as to shut in the pressure currently present at the at least one piston/cylinder assembly.

This switching valve can, for example, be a two-way valve that can be hydraulically, pneumatically, or electrically actuated against the effect of a spring force.

If the hydraulic or pneumatic apparatus comprises a return line, via which the hydraulic or pneumatic medium, which can be provided at the pressure required to actuate the at least one piston/cylinder assembly, can be returned to a reservoir, an emergency switching valve that can be optionally actuated and that closes the return line when actuated can be provided in the return line. The pressure acting on the piston/cylinder assembly is also maintained due to this measure, and activation of the brake assembly is thus prevented.

In an embodiment of the present invention, the lifting-device brake system can, for example, comprise both the switching valve arranged in the return line for the hydraulic or pneumatic actuating medium, directly after the piston/cylinder assembly, and the emergency switching valve. A redundant hydraulic system for maintaining the hydraulic or pneumatic pressure in the piston/cylinder assemblies is thereby created. The switching valve and the emergency switching valve function independently of each other so that, in the case of leakage of one of the two measures, the second always still provides functionality.

A schematic diagram of a hydraulically operated lifting-device brake system according to the present invention is shown in the drawings.

The lifting-device brake system embodiment example shown in the drawings comprises a schematically illustrated brake assembly 100, which comprises four disk brakes 1 that can be activated by a spring force.

Other embodiments of the present invention that comprise several brake assemblies, for example, exactly two, exactly three, or more brake assemblies, are conceivable.

It is also conceivable that a single brake assembly of another embodiment of the present invention comprises a different number of brakes, such as disk brakes, for example, exactly one, exactly two, exactly three, exactly five, or more.

The lifting-device brake system can be arranged on a lifting device having a power, for example, of 9000 metric horsepower.

Each of the disk brakes 1 comprises two piston/cylinder assemblies 1', which can be hydraulically actuated and via which the braking effect achieved by the particular disk brake can be reduced in that the piston/cylinder assemblies 1' are designed to act against the spring force when pressure is applied.

The illustrated embodiment example of the lifting-device brake system further comprises a hydraulic assembly 200 which provides the hydraulic pressure required to actuate the piston/cylinder assemblies 1'.

Unless otherwise mentioned below, the 3/2-way valves are valves that can be electrically actuated.

The hydraulic assembly 200 comprises a reservoir 47 for a hydraulic medium.

Via a hydraulic pump 2 arranged in a feed line a, which hydraulic pump 2 is driven by an electric motor 4, the hydraulic medium is pumped through a filter unit 35. From this filter unit 35, the hydraulic medium reaches the feed line b, in which a 3/2-way valve 11 is arranged. After the 3/2-way valve 11, as viewed in the flow direction of the hydraulic medium, the feed line b leads into a return line c, which leads back to the reservoir 47.

A feed line d branches off before the 3/2-way valve 11. A check valve 17, which opens in the flow direction of the hydraulic medium, is arranged in the feed line d.

After the check valve 17, as viewed in the flow direction, a 3/2-way valve 20 is arranged in the feed line d. After the 3/2-way valve 20, the feed line d branches into individual supply lines e to the piston/cylinder assemblies 1'.

A pressure accumulator 10, a pressure sensor 7, and a pressure display device 8 are arranged between the check valve 17 and the 3/2-way valve 20. A further pressure-measuring device 6 is arranged in the feed line a.

In each of the individual lines e, a check valve 40 that opens in the flow direction of the hydraulic medium is arranged before the particular piston/cylinder assembly 1' to which the particular individual line e is connected.

Each of the piston/cylinder assemblies 1' has an outlet, to which a return line f is connected.

All return lines f are connected to the return line c.

As viewed in the return flow direction, a 3/2-way valve that can be manually actuated is first arranged. Two further 3/2 way valves 23, 22 follow, which are arranged one after the other in the return flow direction.

For the 3/2-way valve 22, a bypass G is provided, in which a 3/2-way valve 21 is arranged.

After the check valve 40, as viewed in the flow direction, the feed line d and the return line c are connected to each other via an adjustable restrictor valve 34.

After the 3/2-way valve, as viewed in the flow direction, a pressure accumulator 12, a pressure-measuring device 13, and a pressure display device 14 are connected to the feed line d.

The feed line a and the return line c are also connected to each other via a pressure-limiting valve 12.2.

An emergency pressure line h is also provided between the reservoir 47 and the manually actuated 3/2-way valve 28. A manually actuated emergency pump 30 is arranged in the emergency pressure line h. The emergency pressure line h is connected to the return line c and to actuating elements of the 3/2-way valves 21, 22 via a pressure-limiting valve 12.2'.

A two-way valve 41.1 . . . 41.8, which can be hydraulically actuated, is arranged in each of the return lines f, directly after the piston/cylinder assemblies 1'.

On the actuation side, the two-way valves 41.1 . . . 41.8 are connected to a hydraulic control line i, which is connected to the feed line d, after the check valve 17 as viewed in the flow direction of the hydraulic medium. In the hydraulic control line i, a check valve 46 that opens in the flow direction and thereafter a 3/2-way valve 44 are arranged before the branch points to the two-way valves 41.1 . . . 41.8. The 3/2-way valve 44 is connected to a return line k. A pressure-measuring device 43 is provided after the 3/2-way valve 44.

The mode of operation of this embodiment example of the lifting-device brake system according to the present invention will now be explained on the basis of the three different operating states illustrated in the drawings.

Figure 1:
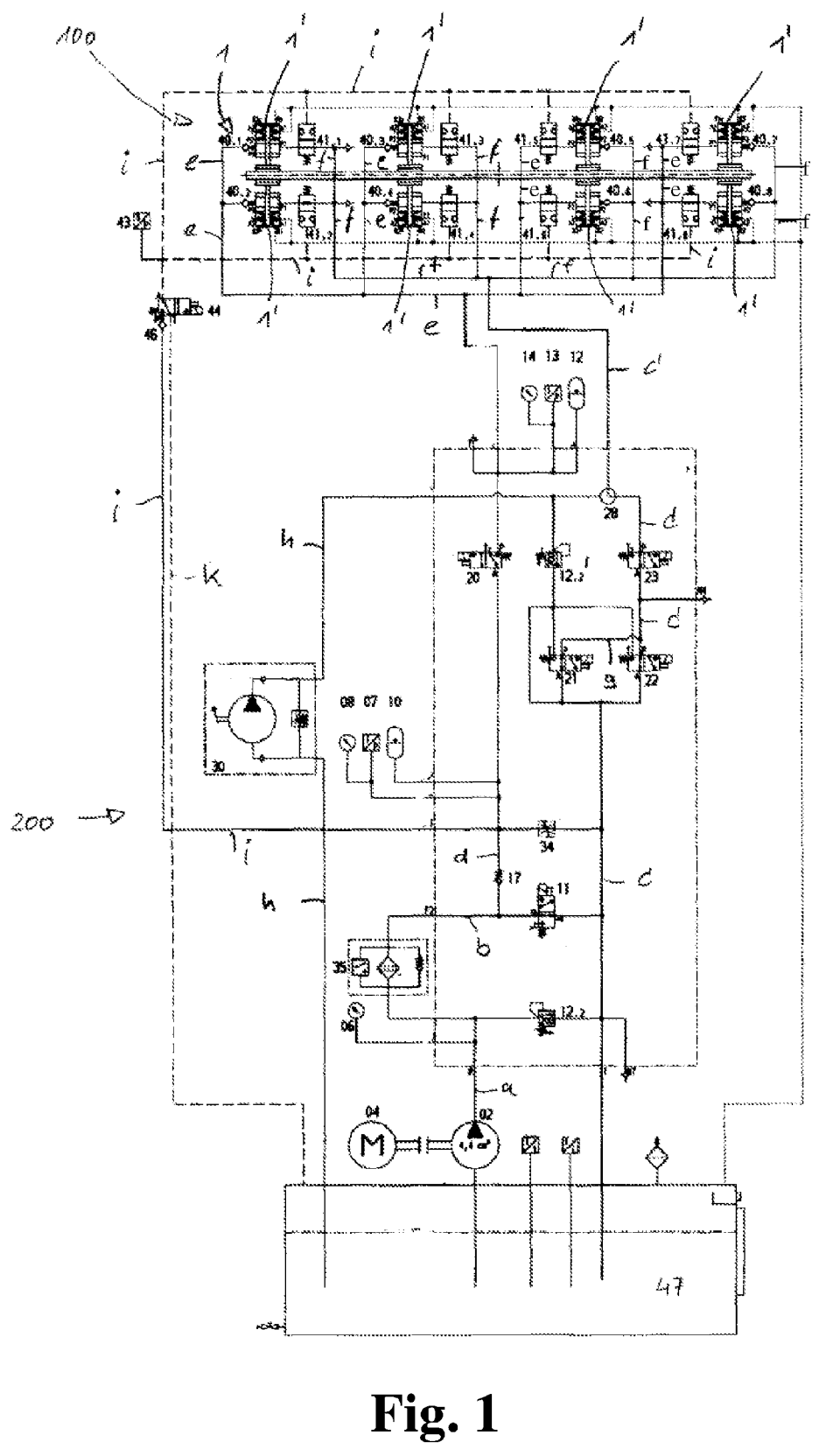

In the operating state illustrated in FIG. 1, the brake assembly 100 is activated, i.e., the piston/cylinder assemblies 1' are unpressurized. For this purpose, the 3/2-way valve 11 is de-energized so that the 3/2-way valve 11 connects the feed line b to the return line c, before the check valve 17 as viewed in the flow direction. The 3/2-way valve 20 is also de-energized, wherein the 3/2-way valve 20 is designed so that the 3/2-way valve 20 closes the feed line d in this state. Hydraulic medium is therefore present between the check valve 17 and the 3/2-way valve 20 at a pressure that is determined by the pressure accumulator 10, sensed by the pressure-measuring device 7, and visualized by the pressure display device 8.

The 3/2-way valves 21, 22, 23 in the bypass g and in the return line c are also de-energized and are designed so that they allow flow in this operating state. The 2-way valves 41.1 . . . 41.8 are in the open position because the 3/2-way valve 44 is also de-energized, and, in this state, the hydraulic control line i is depressurized. Because the manually actuated 3/2-way valve 28 is additionally set appropriately, the piston/cylinder assemblies 1' are connected on the return side to the reservoir 47 and are therefore unpressurized, and the brake assembly 100 is accordingly activated.

In order to deactivate the brake assembly 100, the 3/2-way valve 20 is first supplied with current, as is symbolized in FIG. 2, so that the 3/2-way valve 20 is switched open. At the same time, the 3/2-way valves 21, 22 are supplied with current so that the 3/2-way valves 21, 22 are switched to the closed position thereof. Because the return line c is thus closed and the individual supply lines e are connected to the feed line d, the pressure defined by the pressure accumulator 10, also referred to as "system pressure," is applied to the piston/cylinder assemblies 1' in this state.

If the system pressure, which is sensed by the pressure-measuring device 7, falls below a specified value, the 3/2-way valve 11 is supplied with current so that the 3/2-way valve 11 closes the connection between the feed line b and the return line c. Hydraulic medium is then pumped into the intermediate line d via the check valve 17 at the pressure provided by the hydraulic pump 2 until the desired system pressure is reached and the 3/2-way valve 11 is de-energized.

The pressure-limiting valve 12.2 opens if a maximum permissible pressure (which is 200 bar in the present embodiment) is exceeded.

In order to activate the brake assembly 100 again in normal operation, the 3/2-way valves 20, 21, 22 and (if not already de-energized) also the 3/2-way valve 11 are de-energized so that the operating state illustrated via FIG. 1 arises in which the pressure previously present at the piston/cylinder assemblies 1' can be relieved via the return lines c and f. The bypass g having the 3/2-way valve 21 serves to increase the operational reliability because the pressure is reliably relieved even if one of the two 3/2-way valves 21, 22 is not properly actuatable.

Figure 3:
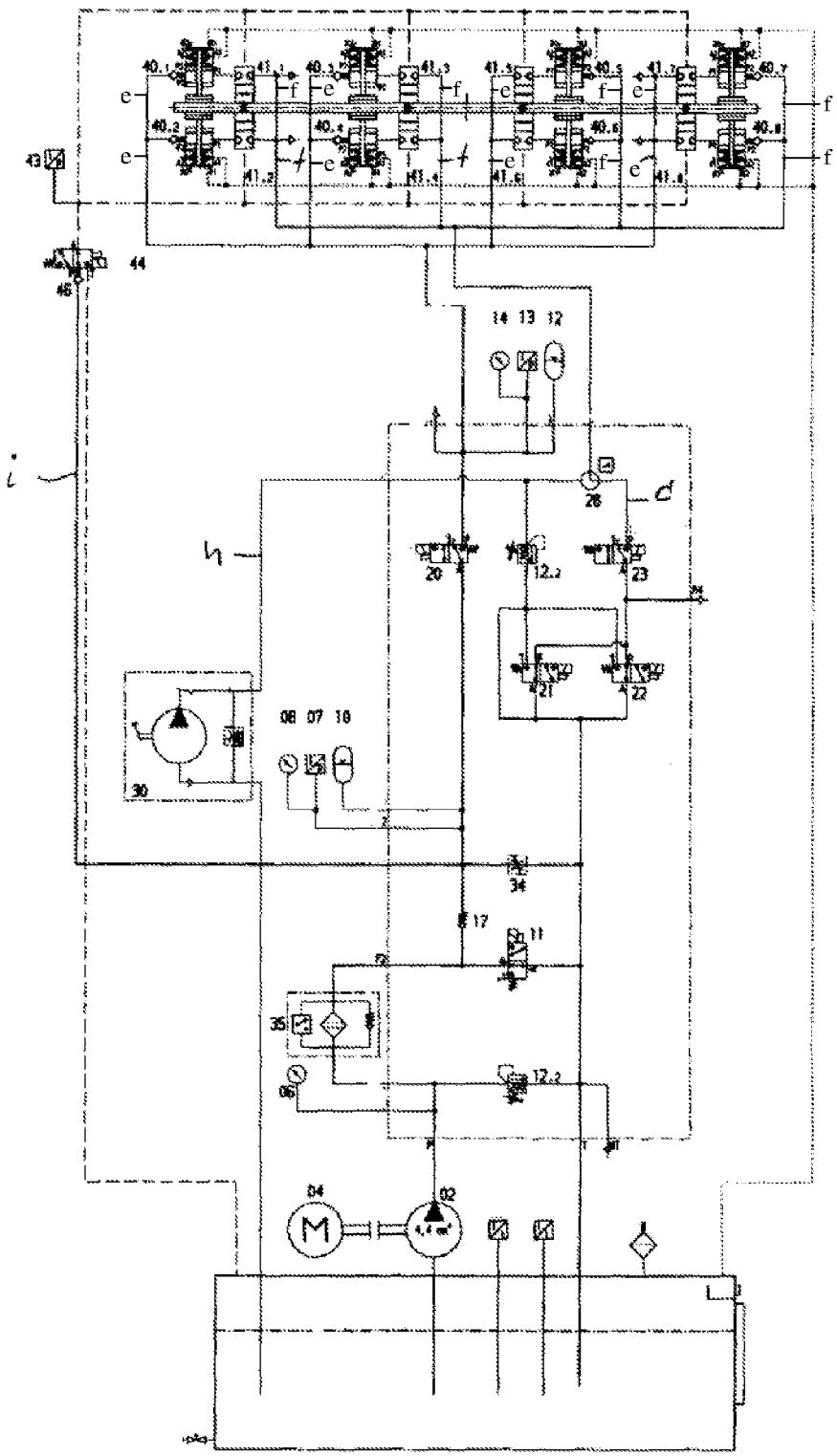
FIG. 3 shows the hydraulic schematic diagram in the "brake released for wave compensation after "emergency stop"."

The functionality of the lifting-device brake system according to the present invention in the event of an "emergency stop," where the wave compensation function is, however, maintained, will now be explained on the basis of FIG. 3.

In the event of an "emergency stop," the entire lifting-device brake system is de-energized. Only the 3/2-way valve 23, also called "emergency switching valve," and the 3/2-way valve 44 are supplied with emergency current so that the emergency switching valve 23 switches and closes the return line c, and the 3/2-way valve 44 switches open. The system pressure defined by the pressure accumulator 10 is then also present at the two-way valves 41.1 . . . 41.8 so that the two-way valves 41.1 . . . 41.8 close the return lines f so that the hydraulic pressure in the piston/cylinder assemblies 1' remains and the brake assembly 100 is not activated.

The closing off of the piston/cylinder assemblies 1' thereby effected is generally sufficient to prevent brake activation. However, in order to provide that the pressure in the piston/cylinder assembly 1' is maintained even if the two-way valves 41.1 . . . 41.8 are not properly actuatable or if leakages there occur, the emergency current actuation of the emergency switching valve 23 and the associated closing of the return line c prevent hydraulic medium from being able to flow back into the reservoir 47.

If a drop in the system pressure defined by the pressure accumulator 10 is nonetheless detected in this operating state, the return line c can be disconnected before the 3/2-way valve 23 in the flow direction of the hydraulic medium and connected to the emergency pressure line h by manual actuation of the 3/2-way valve 28. By manual actuation of the emergency pump 30, the pressure can be held at a pressure that prevents the activation of the brake assembly 100. This working pressure, which acts on the piston/cylinder assemblies 1' in the normal operating state, is defined by the pressure accumulator 12, sensed by the pressure-measuring device 13, and visualized by the pressure display 14.

Via the emergency manual pump 30, hydraulic medium can thus be pumped into the return line c and the pressure present at the piston/cylinder assemblies 1' can thus be increased overall.

The lifting-device brake system according to the present invention is thus distinguished by especially high operational reliability.

The present invention is not limited to embodiments described herein; reference should be had to the appended claims.

LIST OF REFERENCE NUMERALS

100 Brake assembly
200 Hydraulic assembly
1 Disk brakes
1' Piston/cylinder assembly
2 Hydraulic pump
4 Electric motor
6 Pressure-measuring device
7 Pressure-measuring device/Pressure sensor
8 Pressure display device
10 Pressure accumulator
11 Three/two-way valve
12 Pressure accumulator
12.2 Pressure-limiting valve
12.2' Pressure-limiting valve
13 Pressure-measuring device
14 Pressure display device
17 Check valve
20 3/2-way valve
21 3/2-way valve
22 3/2-way valve
23 3/2-way valve/Emergency switching valve
28 Manually actuated 3/2-way valve
30 Emergency pump
34 Adjustable restrictor valve
35 Filter unit
40.1 . . . 40.8 Check valve
41.1 . . . 41.8 Two-way valves
43 Pressure measuring device/Pressure sensor
44 3/2-way valve
46 Check valve
47 Reservoir
a Feed line b Feed line
c Return line
d Feed line
e Individual supply lines
f Return lines
g Bypass
h Emergency pressure line
i Hydraulic control line
k Return line

What is claimed is:

1. A lifting-device brake system comprising:
    at least one brake assembly configured to be activated by a spring force, the at least one brake assembly being configured to achieve a braking effect;
    at least one piston/cylinder assembly configured to be actuated by a hydraulic or pneumatic pressure via which the braking effect achieved by the at least one brake assembly can be reduced by at least partially overcoming the spring force;
    a hydraulic or pneumatic assembly configured to provide the hydraulic or pneumatic pressure to actuate the at least one piston/cylinder assembly, the hydraulic or pneumatic assembly comprising an apparatus configured to maintain the hydraulic or pneumatic pressure applied to the at least one piston/cylinder assembly;
    a separate supply line arranged to supply a hydraulic or pneumatic actuating medium to the at least one piston/cylinder assembly; and
    a separate first return line for the hydraulic or pneumatic actuating medium,
    wherein,
    the apparatus comprises a switching valve arranged in the separate first return line directly behind the at least one piston/cylinder assembly, and
    the switching valve is configured to close the separate return line so as to shut in a pressure existing at the at least one piston/cylinder assembly.

2. The lifting-device brake system as recited in claim 1, further comprising:
    a reservoir,
    wherein,
    the hydraulic or pneumatic assembly further comprises a separate second return line,
    the separate second return line being configured to return to the reservoir the hydraulic or pneumatic medium at a pressure required to actuate the at least one piston/cylinder assembly.

3. The lifting-device brake system as recited in claim 2, further comprising an emergency switching valve arranged in the separate second return line, the emergency switching valve being configured to close the separate second return line when actuated.

4. The lifting-device brake system as recited in claim 1, wherein the at least one piston/cylinder assembly comprises an outlet, and the separate first return line is connected to the outlet.

\* \* \* \* \*